No. 683,520. Patented Oct. 1, 1901.
J. H. TAYLOR.
SPIRAL RIVETED PIPE.
(Application filed Dec. 17, 1900.)
(No Model.)
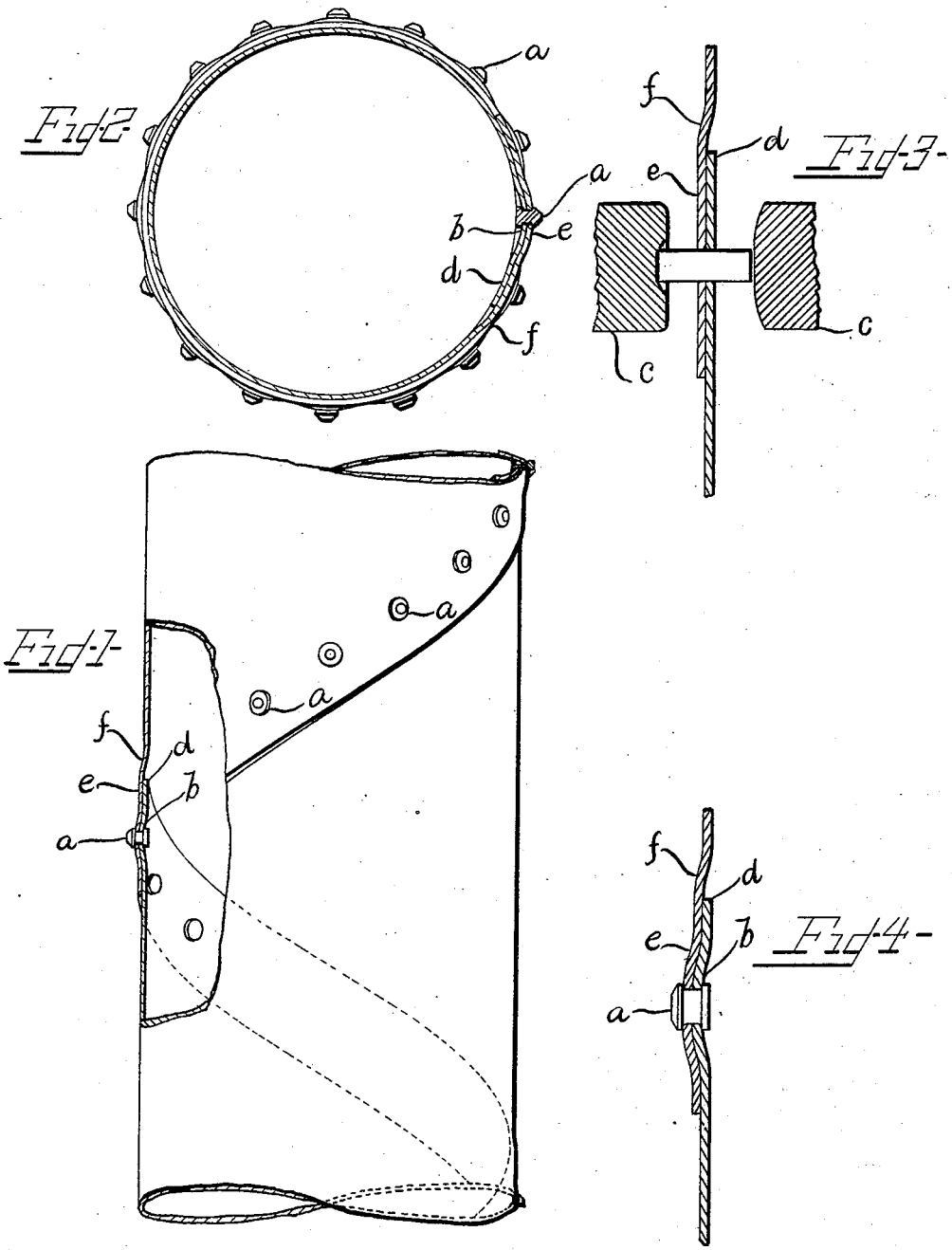

UNITED STATES PATENT OFFICE.

JAMES HALL TAYLOR, OF CHICAGO, ILLINOIS.

SPIRAL RIVETED PIPE.

SPECIFICATION forming part of Letters Patent No. 683,520, dated October 1, 1901.

Application filed December 17, 1900. Serial No. 40,160. (No model.)

*To all whom it may concern:*

Be it known that I, JAMES HALL TAYLOR, a citizen of the United States, residing at Chicago, in the county of Cook and State of Illinois, have invented a certain new and useful Improvement in Methods of Making Pipe, (Case No. 5,) of which the following is a full, clear, concise, and exact description, reference being had to the accompanying drawings, forming a part of this specification.

My invention relates to a new method of forming pipe composed of sheet metal riveted in the required shape and length, and relates more particularly to pipe that is formed of spirally-wound sheet metal having overlapping edges through which the rivets are passed to maintain the spirally-disposed sheet metal in the form of a pipe. In this connection reference may be had to my copending application, Serial No. 15,804, filed May 7, 1900. Heretofore the pipe has either been so constructed that the heads of the rivets upon the interior thereof projected to their full extent within the interior of the pipe, thereby decreasing the capacity of the same, increasing the friction to a fluid flowing therethrough, and affording obstruction and lodging-places for subdivided solid matter passing through the pipe, whereby the usefulness of riveted pipe is seriously impaired, or the inner rivet-heads have been contained within countersunk holes, which materially weakened the pipe and permitted impairment of the metal immediately surrounding the rivet-heads contained in the countersunk openings, the moisture or other deleterious agency finding its way beneath the inner heads and the surrounding metal. Moreover, pipes provided with countersunk rivet-openings have to be made of thicker material, as it would be impossible to securely fasten the same were very thin sheet metal employed.

In accordance with my invention indentations are provided upon the interior of the pipe that receive the inner rivet-heads to remove the same either wholly or partially outwardly from the circumference of the pipe, the indentations being formed around the rivet-openings without countersinking the same, the rivet-heads being larger than the rivet-openings and thoroughly sealing the openings, whereby these rivet-heads are either wholly or partially prevented from affording obstruction to material flowing through the pipe, so that the various objections heretofore existing are overcome. I prefer to form the indentations upon the interior of the pipe sufficiently deep to contain the entire rivet-heads, whose tops are preferably made flush with the inner face of the pipe, so that when the pipe is viewed endwise no portion of the heads will be seen to project inwardly. These indentations are preferably formed by bulging the metal outwardly where each rivet is placed, the thickness of the metal preferably not being impaired by having the overlapping edge portions of the metal both bulging outwardly.

My improved process consists in forming these bulges by means of the rivet wire or blanks as they are acted upon by the machinery to form the completed rivets.

In accordance with the process of my invention the intermediate portions of the rivet-blanks are enlarged in cross-section in the process of their compression, so that the surrounding sheet metal forming the pipe is engaged by these enlarged portions of the rivet-blanks and forced thereby outwardly to form bulges that are substantially concentric with respect to the rivet-heads. The holes in the overlapping edge portions of the sheet metal are preferably formed separately, after which the rivet-blanks, that are preferably of the same diameter, are passed through and compressed. The riveting-dies preferably simultaneously engage the ends of the rivet-blanks, and those portions of the rivet-blanks that project outwardly from the pipe are preferably longer than those that project within the pipe, especially where the pipe is not bodily moved in the act of riveting, so that the greater quantity of metal upon the exterior of the pipe when crowded into the apertures will secure the desired bulging, which might not be secured to the extent desired if the lengths of the rivet-blanks upon the interior and exterior of the pipe were equal or where the lengths of the rivet-blanks upon the interior of the pipe exceeded the lengths of the blanks upon the exterior.

I will explain my invention more fully by reference to the accompanying drawings, in which—

Figure 1 is a longitudinal sectional view of a part of a pipe constructed in accordance with my invention; Fig. 2, an end view of the structure illustrated in Fig. 1; Fig. 3, a view somewhat diagrammatic, illustrating the riveting-dies and a rivet in the act of being formed; Fig. 4, an enlarged sectional view showing the final formation of the rivet and the contiguous portion of the pipe.

Like parts are indicated by similar characters of reference throughout the views.

The pipe is formed by spirally winding a strip of sheet metal, as iron, the edge portions of the sheet metal overlapping, as is clearly indicated. Rivets $a$ $a$ are passed through the overlapping edge portions of the sheet metal, the rivets when formed being preferably shaped as illustrated, having inner heads upon the interior of the pipe, the heads of each rivet being sufficiently compressed toward each other to thoroughly clamp the metal between the same. Where each rivet is located, an indentation $b$ is preferably provided upon the interior of the pipe that preferably projects outwardly from the pipe sufficiently to contain the entire inner rivet-head to remove the same from the bore of the pipe. The rivets are preferably formed from rivet-blanks that are unprovided with rivet-heads, the rivet-blanks being of a diameter substantially equal to the diameter of the apertures in the overlapping edges of the pipe through which the blanks are passed, the rivet-blanks after being inserted being simultaneously engaged by riveting dies or hammers $c$ $c$, one located upon the exterior of the pipe and the other upon the interior, these dies being preferably simultaneously actuated toward the pipe between the same, so that rivet-heads are simultaneously formed upon the ends of the blanks, pressure being exerted upon the said blanks longitudinally thereof. The pipe is preferably held stationary while the rivets are being formed, and in order that the bulges of proper contour and depth may be formed when the pipe is thus held stationary I preferably place the major portion of the rivet-blanks upon the exterior of the pipe, the minor portion being contained within the interior. By this means the inner edge portion $d$ is bulged outwardly, as is also the outer overlapping portion of the sheet metal $e$, the outer protuberance of the inner portion $d$ fitting the inner recess formed in the portion $e$, in which latter portion a bulge is formed, the apex of which is directly engaged with the outer rivet-head. It will be observed that the indentations formed in the portions $d$ and $e$ are had without removing any of the metal. Where the portions $d$ and $e$ of the metal forming the pipe overlap, an offset is preferably provided in the outer portion $e$ at $f$, which forms a spiral recess upon the interior of the pipe that receives the inner portion $d$, so that a smooth bore of uniform diameter is provided for the pipe.

While I have illustrated the recesses formed upon the interior of the pipe as being deep enough to contain the entire rivet-heads, I do not wish to be limited to a process where this exact result is accomplished, as the rivet-heads may be contained in these recesses and yet not altogether lying outside of the inner periphery of the pipe.

By means of my invention it will be apparent that many advantages are secured over structures of the prior art, and while I have herein shown and particularly described the preferred method of practicing my invention I do not wish to be limited to the precise embodiments shown, as modifications may be made without departing from the spirit of the invention; but,

Having thus described my invention, I claim as new, and desire to secure by Letters Patent, the following:

1. The process of making pipe, which consists in winding sheet metal in the form of a spiral, one edge portion of the spirally-wound sheet metal overlapping the contiguous edge portion, perforating the overlapping edge portions of the pipe, passing rivet wire or blanks through the perforations, applying pressure to the rivet-blanks and thereby enlarging the intermediate portions of the rivet-blanks, and forcing the metal of the pipe surrounding the rivet-blanks outwardly by the intermediate portions of the rivet-blanks as these portions are increased in size, and thereby forming recesses in the pipe surrounding the inner rivet-heads and containing the same, substantially as described.

2. The process of making pipe, which consists in winding sheet metal in the form of a spiral, one edge portion of the spirally-wound sheet metal overlapping the contiguous edge portion, perforating the overlapping edge portions of the pipe, passing rivet wire or blanks through the perforations, the portions of the blanks upon the exterior of the pipe being longer than those portions upon the interior, applying pressure to the rivet-blanks and thereby enlarging the intermediate portions of the rivet-blanks, and forcing the metal of the pipe surrounding the rivet-blanks outwardly by the intermediate portions of the rivet-blanks as these portions are increased in size, and thereby forming recesses in the pipe surrounding the inner rivet-heads and containing the same, substantially as described.

3. The process of making pipe, which consists in winding sheet metal in the form of a spiral, one edge portion of the spirally-wound sheet metal overlapping the contiguous edge portion, perforating the overlapping edge portions of the pipe, passing headless rivet wire or blanks through the perforations, the portions of the blanks upon the exterior of the pipe being longer than those portions upon the interior, applying pressure to the rivet-blanks and thereby enlarging the intermediate portions of the headless rivet-blanks, and forcing the metal of the pipe surrounding the rivet-blanks outwardly by the intermediate portions of the rivet-blanks as these portions are increased in size, and thereby forming recesses in the pipe surrounding the inner rivet-heads and containing the same, substantially as described.

4. The process of making pipe, which consists in winding sheet metal in the form of a spiral, one edge portion of the spirally-wound sheet metal overlapping the contiguous edge portion, perforating the overlapping edge portions of the pipe, passing headless rivet wire or blanks through the perforations, applying pressure to the rivet-blanks and thereby enlarging the intermediate portions of the headless rivet-blanks, and forcing the metal of the pipe surrounding the rivet-blanks outwardly by the intermediate portions of the rivet-blanks as these portions are increased in size, and thereby forming recesses in the pipe surrounding the inner rivet-heads and containing the same, substantially as described.

In witness whereof I hereunto subscribe my name this 13th day of December, A. D. 1900.

JAMES HALL TAYLOR.

Witnesses:
GEORGE L. CRAGG,
HARVEY L. HANSON.